Sept. 15, 1936.   T. Y. TANDY   2,054,145
GAS TANK CAP LOCK
Filed Jan. 19, 1934
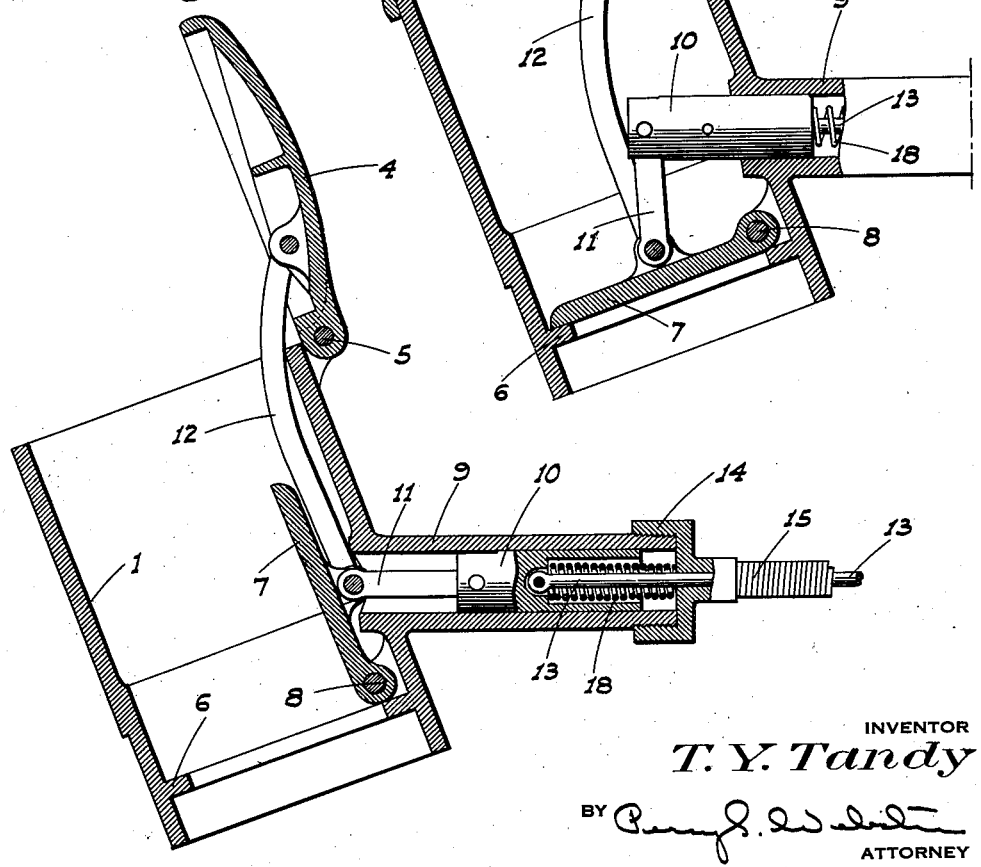

Patented Sept. 15, 1936

2,054,145

UNITED STATES PATENT OFFICE 2,054,145

GAS-TANK CAP LOCK

Thomas Y. Tandy, Stockton, Calif.

Application January 19, 1934, Serial No. 707,254

9 Claims. (Cl. 220—55)

This invention relates to tank cap control and lock devices for the fuel tanks of motor vehicles; my principal object being to provide a device of this character so constructed and arranged that the cap can only be opened and closed from the interior of the vehicle and when closed, said cap is automatically locked against being opened from the outside. At the same time the control or cap operating mechanism functions without a key being necessary to hold the cap in a closed position.

By means of this device therefore if the car doors are locked it is impossible for the cap to be opened or removed by a petty thief and the fuel siphoned from the tank as is now frequently done when a car is left unattended. Also the cap is permanently mounted on the filler tube of the tank so that it will never be lost after filling the tank as is now very often the case due to the negligence of the service station operators in failing to replace the cap.

I am aware that locking caps, using either a key or necessitating the working of a combination, have been devised for use on fuel tanks to prevent theft. These however require that the owner himself get out of the car to unlock and remove the cap and do not prevent loss of the cap due to failure to replace the same. With my improved structure on the other hand the driver on reaching a service station opens the cap for the admission of the hose nozzle from his seat in the car and again closes the cap after the nozzle is withdrawn.

Another feature of advantage of my device due to its operation from inside the car is in the event of fire starting in the engine compartment or elsewhere while the car is in motion, the driver can instantly open the cap. This is an operation which safeguards the fuel against an explosion but which now must be done from the outside and of course after the car has been brought to a full stop.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawing similar characters of reference indicate corresponding parts in the several views:

Figure 1 is a diagrammatic elevation showing the cap and its operating means as mounted on a motor vehicle.

Figure 2 is a sectional elevation of the cap unit detached and with the cap closed.

Figure 3 is a similar view showing the cap open.

Referring now more particularly to the characters of reference on the drawing, the device comprises a tube member 1 which may either be formed as the filler tube of the fuel tank 2, as the factory equipment, or applied as an attachment to the tube 3 of the tank as shown in Figure 1. In the latter case the top of the cap-holding rim of the tube 3 is cut off, and the lower portion of the tube 1 is inserted in said tube 2 and rigidly secured thereto as by riveting or the like. In order to insure a tight fit of the two tubes together, the lower portion of the tube 1 on the outside may be machined down according to the size of the filler tube which it is to engage, as indicated in the drawing.

A cap 4 of substantial character engages the upper end of the tube 1, being hinged to the forward side of said tube as shown at 5. Near the bottom the tube 1 is provided with an inwardly projecting flange 6 forming a seat for a flap valve 7 above said flange, which is hinged as at 8 to the interior of the tube on the same side as the cap. The cap and valve therefore are capable of opening and closing movement in the same direction relative to the front side of the tube.

Projecting forwardly from and rigid with the tube 1 in a plane between the cap and valve is a tubular casing 9 open to the tube and serving as a guide and support for a slidable plunger or piston 10. A link 11 connects the tube end of the plunger and the upper surface of the valve. This link is arranged so that when the valve is seated by the advancing movement of the plunger into the tube, it is disposed in a position beyond dead center relation to the plunger as shown in Figure 2. Also the link is arranged so that when the plunger is moved in the opposite direction and the valve is raised from its seat, the link is free to enter the casing, so that the valve may assume a position adjacent and parallel to the front wall of the tube. This provides a wide open passage through the tube as shown in Figure 3 for the insertion of the filling hose nozzle.

Another link 12 connects the valve and the under surface of the cap 4. This link is arranged to cause the cap to assume an open position substantially parallel to the valve when the latter is open as in Figure 3, and to be fully closed and in cooperation with the tube when the valve is seated as shown in Figure 2. Since the valve when seated is locked against upward movement by the dead center arrangement of the link 11 as previously described, the cap is firmly locked and cannot be pried up from outside the tube.

To pull the plunger in a cap opening direction I provide a flexible pull wire or cable 13 which is connected to the outer end of the plunger and extends thence through a guide cap 14 on the outer end of the casing 10 and through a flexible conduit 15 of conventional character to a pull knob 16 on the instrument board 17 of the vehicle. A spring 18 in the casing 11 between the cap 14 and the plunger acts on the latter to move the same to a cap and valve closing position.

Both the opening and closing movements of the cap therefore are controlled from the interior of the car without the possibility of the cap being opened from the outside unless the parts are actually sprung or broken. Even if the cap should possibly be pried up the valve below would still be seated and not being easy to open from the upper end of the tube, would offer an obstruction to the removal of the fuel from the tank.

If desired I may provide a standard type of lock device on the instrument board, as indicated at 19, to engage the wire 13 at the knob end so as to prevent pulling out of the knob. Such a lock would prevent the opening of the cap by an unauthorized person if the car was left unlocked in a storage garage etc. in which the regulations usually require the car to be left so that the attendant can drive the same in case of need.

The casing 9 and the adjacent end of the wire and its enclosing conduit are disposed below and concealed by the finish sheathing plate 20 now commonly used over motor vehicle tanks, so that the housing and wire cannot be easily tampered with at the rear end.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. In combination with the filler tube of a motor vehicle fuel tank, a cap for said tube hinged thereon, a control wire extending from the tube to the instrument board of the vehicle, and connections between the tube end of said wire and the cap to both open and close the latter with movements of the wire in opposite directions.

2. In combination with the filler tube of a motor vehicle fuel tank, a cap for said tube hinged thereon, a pull wire extending from the tube to the instrument board of the vehicle, connections between the tube end of the wire and the cap to turn the latter to an open position with a pull on the wire, and spring means acting against such pull to close the cap.

3. A filler tube for a fuel tank, a cap hinged thereon for upward opening movement, a member slidably projecting into the tube through one side thereof and below the cap, means to pull said member lengthwise, and means between said member inside the tube and the interior surface of the cap to lift the latter with a movement of the member away from the tube.

4. A filler tube for a fuel tank, a cap hinged thereon for upward opening movement, a member slidably projecting into the tube through one side thereof and below the cap, means to pull said member lengthwise, a flap valve closing the tube below the cap, and connections between the member and the valve and cap to open them simultaneously with a longitudinal movement of the member.

5. A filler tube for a fuel tank, a cap hinged thereon for upward opening movement, a member slidably projecting into the tube through the same side thereof as that on which the cap is hinged and below the cap, means to pull said member lengthwise, a flap valve closing the tube below the member, a pivoted link connecting the tube end of the member and the flap valve, and another link connecting the valve and the under side of the cap.

6. A structure as in claim 5, in which said first named link, when the valve is fully closed, is moved past a dead center position relative to the member.

7. A filler tube for a fuel tank, a cap hinged thereon for upward opening movement, a member slidably projecting into the tube through the same side thereof as that on which the cap is hinged and below the cap, a pull wire connected to the outer end of the member, a casing rigid with the tube in which said member is slidably mounted, connections between said member inside the tube and the under face of the member away from the tube, and a spring in the casing engaging the outer end of the member to urge the same to a cap closing position.

8. A filler tube for a fuel tank, separate closures for said tube spaced axially thereof, one closure being inside the tube, means connecting the closures for simultaneous opening and closing movement, and remote control means connected to one closure for operating the same.

9. The combination with a vehicle of a fuel supply tank having a filling opening outside the vehicle, a closure cap for said opening, means for opening and closing said cap, and further means associated with said first means to operate thereupon whereby to alternately open and close said cap, such further means including an operating instrumentality extending to a remote point within the vehicle, such opening and closing means being inaccessible except from such remote point.

THOMAS Y. TANDY.